Patented Dec. 9, 1952

2,621,127

UNITED STATES PATENT OFFICE 2,621,127

METHODS OF DEHYDRATING AND CURING VANILLA FRUIT

Louis V. Towt, Los Angeles, Calif., assignor to McCormick & Company, Incorporated, Baltimore, Md., a corporation of Maryland No Drawing. Application January 9, 1951, Serial No. 205,225

12 Claims. (Cl. 99—140)

The present invention relates to a new method of curing and dehydrating green vanilla beans prior to the extraction of vanilla therefrom by any of the well known extraction processes.

Vanilla beans will, of course, cure perfectly if left on the vine, but the pod splits and loses its contents, rendering the bean unfit for market. Therefore, in accordance with conventional practice, the beans are not allowed to ripen on the vines but are gathered when the free tip begins to turn yellow. The unripe or green bean has no flavor or odor, but these are developed during the curing process.

Aside from certain primitive methods, there are only two processes of curing green vanilla beans currently employed, known as Mexican and Bourbon processes. In the Mexican process, the green beans are placed on blankets and exposed to the direct rays of the sun for about one hour. They are then placed in blanket-lined cases, where they are allowed to "sweat" for 24 to 48 hours. The sweating process is repeated a number of times until the proper aroma and flavor are obtained, after which the beans are spread on racks and air circulated thereabout, whereby the beans are cooled and aged.

The Bourbon process is essentially the same as the Mexican process except the beans are not exposed to direct rays of the sun and are initially plunged into water near the boiling point. Both the Mexican and Bourbon processes take three to four months to complete, depending largely on weather conditions, and the uniformity of the resulting product leaves much to be desired, because of the many variables involved in the processes.

The primary object of this invention is to cure and dehydrate green vanilla beans by a process which is much more rapid than the processes heretofore employed, and in which all variable factors may be accurately controlled.

Another object is to provide a process for curing and dehydrating green vanilla beans which includes an initial grinding of the beans, which are subsequently cured and dehydrated in the form of a thick, fluid pulp or puree, whereby the natural enzymes rapidly and uniformly react in the pulp mass to form vanillin without destroying the constituents which impart a fruity flavor of vanilla and contribute to the characteristic aroma of vanilla.

A further object is to provide a process for curing and dehydrating vanilla beans which is independent of weather conditions and allows the moisture content and other characteristics of the ultimate product to be precisely controlled.

Other and further objects of the invention will be in part apparent and in part set out in the detailed description of the several steps in the process which follows:

The green vanilla beans are initially ground to a thick, fluid pulp of puree-like consistency, by passing the beans through a comminuting or grinding machine, such as a Fitzpatrick comminuting machine using a ½ inch square screen. At this stage, the moisture content of the bean pulp is about 85%. The pulp may be easily conveyed, but is preferably pumped to a tank wherein the bean pulp is cured. The tank is preferably of cylindrical form and vertically disposed with an inlet and outlet at the bottom and top end walls, respectively. The pulp may be agitated and heated within the tank by any suitable means. Preferably, a vertically disposed, coiled pipe is mounted for rotation on a vertical axis within the tank. Hot water, which may be thermostatically controlled to maintain a temperature of 120° F. to 130° F. within the tank, is circulated through the coiled pipe. Radially extending blades or the like may be associated with the pipe to more efficiently mix and heat the pulp.

Warm air is forced upwardly through the pulp mass under pressure by means of an air pump, which may deliver the air through a plurality of holes in the bottom of the tank. The air is thus intimately mixed with the pulp as it is being heated and agitated.

As previously stated, the green vanilla beans have no flavor or odor, but these are developed during the curing process. The constituents which impart a fruity flavor to vanilla are unknown, but they are important to the curing process, and it is among these constituents that defects in the curing of beans will show up plainly. Sugars and acids are in these groups.

Vanillin, which is chemically methyl-protocatechuic aldehyde, is one of the most important constituents developed during the curing process, because the characteristic aroma of vanilla is due largely to vanillin. Glucoside coniferin, which is present in the green bean, is split up, probably by an enzyme, into coniferyl alcohol and glucose and the coniferyl alcohol by proper oxidation forms vanillin.

It has been found that the fruity flavor, characteristic of vanilla, and vanillin, may be developed to the same degree in the above described curing process as was developed in the traditional methods, even though the green beans in the present process are cured in the form of a thick, fluid pulp or puree, and in a small fraction of the time formerly required.

The green beans are heated in the present process to substantially 120° F. to 130° F. for approximately 48 hours, with simultaneous agitation and aeration. Treatment of green vanilla pulp in this manner allows the natural enzymes to react uniformly in the pulp mass to form coniferyl alcohol and glucose, and greatly accelerates the oxidation of the coniferyl alcohol into vanilla. Since the curing process is essentially enzymatic, it is important that the agitation, heating and aeration be carried out simultaneously.

After the ground vanilla pulp has been cured, it is pumped out of the curing tank and spread on trays which are placed in a dehydrator. Artificial heat is used in the dehydrator and thermostatically controlled to a temperature of substantially 138° F. to 142° F. During the dehydrating process, the beans are turned once so that they may be uniformly and evenly dried. After the moisture content is lowered to about 20%, the beans are removed therefrom and reground to a finer degree and thereafter may be immediately packed for shipment to the extract manufacturer.

The present process of preparing green vanilla beans for the extract manufacturer is a radical departure from former processes, because the green beans are initially ground to a thick, fluid pulp or puree and cured in that form. Processing of the pulp mass, as described, enables the natural enzymes of the beans rapidly and uniformly to form coniferyl alcohol and accelerates oxidation of the alcohol to vanillin, without destroying the unknown constituents which impart a fruity flavor to the manufactured vanilla extract, or dissipating the natural volatile oils which contribute to the aroma characteristic of vanilla. The actual curing process is, therefore, much more rapid than former methods, and, furthermore, since it is not dependent on weather conditions and other variables which cannot be controlled, the uniformity and consistent excellency of the product is enhanced, and an even greater saving of time is effected.

It is to be particularly noted that the moisture content of the bean pulp may be precisely determined so that the extract manufacturer receives the bean pulp with uniform characteristics, and since the vanilla beans are already in pulp form, the manufacturer may immediately process the pulp, whereby the original grinding step in present-day extraction processes is eliminated.

Although preferred ranges of temperatures and times for the curing and drying steps of the process have been set forth above, it must be understood that the invention is not limited thereto, so long as the desired results are effected, as other temperatures and times may be employed. The invention includes all variations in procedures covered by the appended claims and their equivalents.

I claim:
1. The method of curing green vanilla beans which comprises reducing the green beans to a thick, fluid, puree-like pulp and heating the pulp in intimate association with air to effect a cure of the pulp.
2. The method in accordance with claim 1 in which the pulp is heated at a temperature of substantially 120° F. to 130° F.
3. A method in accordance with claim 1 characterized by the step of agitating the pulp during the heating thereof.
4. The method of claim 2 in which the heating of the pulp is carried out for substantially 48 hours.
5. The method of claim 1 in which the heating of the pulp is carried out for substantially 48 hours at a temperature of substantially 120° F. to 130° F. while simultaneously agitating the pulp.
6. A method in accordance with claim 1 characterized by the step of forcing air through the pulp during the heating thereof.
7. A method in accordance with claim 1, including the step of reducing the moisture content of the cured pulp from substantially 85% to a moisture content of substantially 20%.
8. A method in accordance with claim 7 in which the reduction of the moisture content is effected at a temperature of substantially 138° F. to 142° F.
9. A method in accordance with claim 7 characterized by the step of regrinding the dried pulp to a finer degree.
10. A method in accordance with claim 7 in which the pulp is heated at a temperature of substantially 120° F. to 130° F. for substantially 48 hours, prior to the reduction of the moisture content of the pulp.
11. A process in accordance with claim 1 in which the pulp initially has a moisture content of substantially 85%, in which the pulp is heated and aerated for a sufficient time and at a sufficient temperature to complete the curing thereof, and in which the cured pulp is subjected to a drying operation to reduce its moisture content to substantially 20%.
12. A process in accordance with claim 11 characterized by the step of regrinding the dried material to a finer degree.

LOUIS V. TOWT.

REFERENCES CITED

The following references are of record in the file of this patent:

"Vanilla Extract" by Dean et al., "The Journal of Industrial and Engineering Chemistry," July, 1916, vol. 8, No. 7, pages 607–614.